United States Patent [19]
Laszlo et al.

[11] Patent Number: 6,003,699
[45] Date of Patent: *Dec. 21, 1999

[54] CONTAINER NECK FINISH AND METHOD AND APPARATUS FOR FORMING SAME AND CAP FOR USE THEREON

[75] Inventors: Sandor G Laszlo, Fremont; Daniel Luch, Morgan Hills; Richard E Repp, San Jose, all of Calif.

[73] Assignee: Portola Packaging, Inc., San Jose, Calif.

[ * ] Notice: This patent is subject to a terminal disclaimer.

[21] Appl. No.: 08/894,189

[22] PCT Filed: Jan. 16, 1996

[86] PCT No.: PCT/US96/00639

§ 371 Date: Jul. 29, 1997

§ 102(e) Date: Jul. 29, 1997

[87] PCT Pub. No.: WO96/24526

PCT Pub. Date: Aug. 15, 1996

Related U.S. Application Data

[63] Continuation-in-part of application No. 08/385,808, Feb. 9, 1995, abandoned.

[51] Int. Cl.$^6$ .......................... B65D 41/48; B29C 49/50; B29C 25/00
[52] U.S. Cl. .............................. 215/43; 215/45; 215/344; 264/536; 425/527
[58] Field of Search ................. 215/43–45, 256, 215/252, 343, 344, 354; 206/508, 309; 264/533, 536, 531, 163; 425/525, 527, 289, 292, 296, 298, 308, 310

[56] References Cited

U.S. PATENT DOCUMENTS

| | | | |
|---|---|---|---|
| 3,343,698 | 9/1967 | Anderson et al. | 215/45 |
| 3,572,413 | 3/1971 | Livingstone | 215/45 X |
| 3,592,349 | 7/1971 | Baugh | 215/45 X |
| 3,784,038 | 1/1974 | Uhlig | 215/45 |
| 3,940,004 | 2/1976 | Faulstich | 215/256 |
| 4,037,748 | 7/1977 | Stubbs, Jr. | 215/256 |
| 4,187,070 | 2/1980 | Martin . | |
| 4,202,455 | 5/1980 | Faulstich . | |
| 4,305,517 | 12/1981 | Dennis | 215/256 |
| 4,402,451 | 9/1983 | Woerz et al. | 206/509 X |
| 4,496,066 | 1/1985 | Bullock . | |
| 4,699,285 | 10/1987 | Perne . | |
| 4,699,286 | 10/1987 | Nolan . | |
| 4,699,287 | 10/1987 | Bullock . | |
| 4,732,289 | 3/1988 | Granat et al. | 215/44 |
| 4,823,967 | 4/1989 | Thompson | 215/45 |
| 4,844,268 | 7/1989 | Bullock, III | 215/256 |
| 4,903,849 | 2/1990 | Wallman | 215/256 |
| 5,256,055 | 10/1993 | Morris | 425/527 |
| 5,373,955 | 12/1994 | Marino . | |

FOREIGN PATENT DOCUMENTS

| | | | |
|---|---|---|---|
| 2205150 | 8/1972 | Germany | 215/45 |
| 2103990 | 3/1983 | United Kingdom | 264/536 |

*Primary Examiner*—Stephen K. Cronin
*Assistant Examiner*—Nathan Newhouse
*Attorney, Agent, or Firm*—Julian Caplan; Flehr Hohbach Test; Albritton & Herbert LLP

[57] ABSTRACT

The neck of a container has a smooth seal surface engaged by the inner skirt or plug of a cap. Such surface is free of trim and parting line flaws which are characteristic of blow-molded jars because the surface is formed in such a way that the seal surface is not in contact with mold parting lines and further the trim (excess plastic) of the neck is located away from the sealing surface. In one form of the disclosure, above the sealing surface the neck wall slants outward and then bends upward-inward in a short, tapered stretch about 18° to the horizontal which engages the underside of the cap disk to compress against the disk or a liner or foil. Other forms of seal surfaces are disclosed. The exterior of the neck is formed with shoulders which engage over locking beads on the interior of the outer skirt of the cap. Caps suitable for combination with the neck, methods of forming the neck and mold apparatus for forming the neck are also disclosed.

17 Claims, 10 Drawing Sheets

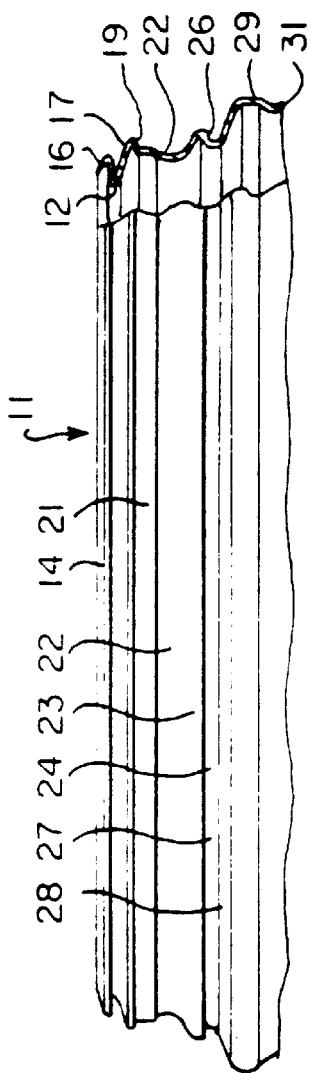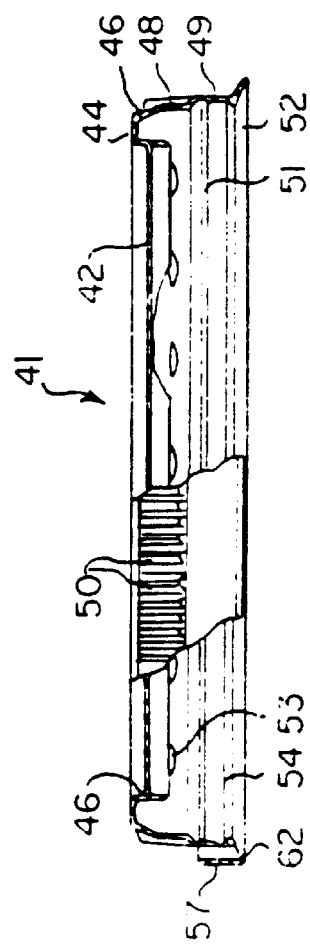

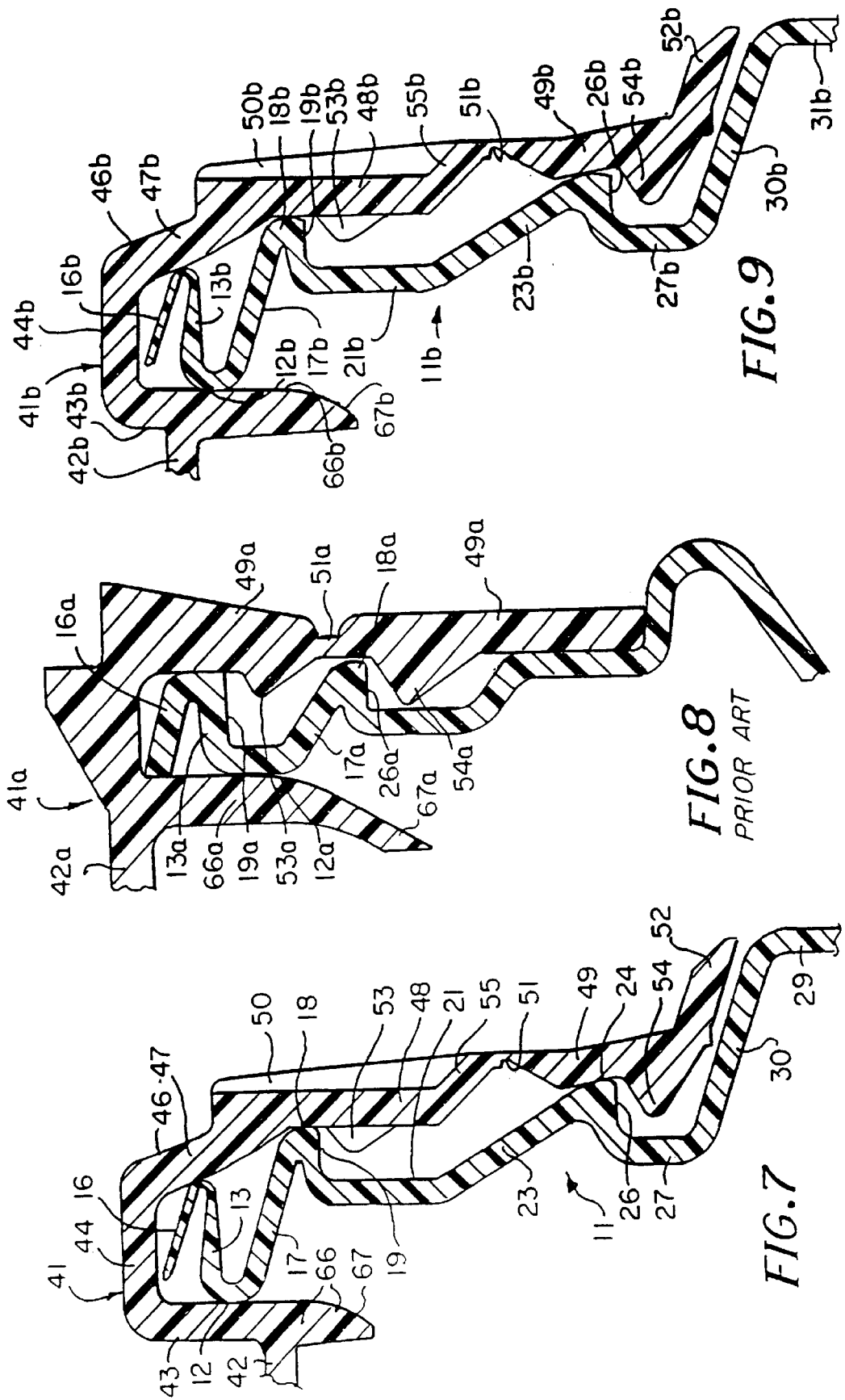

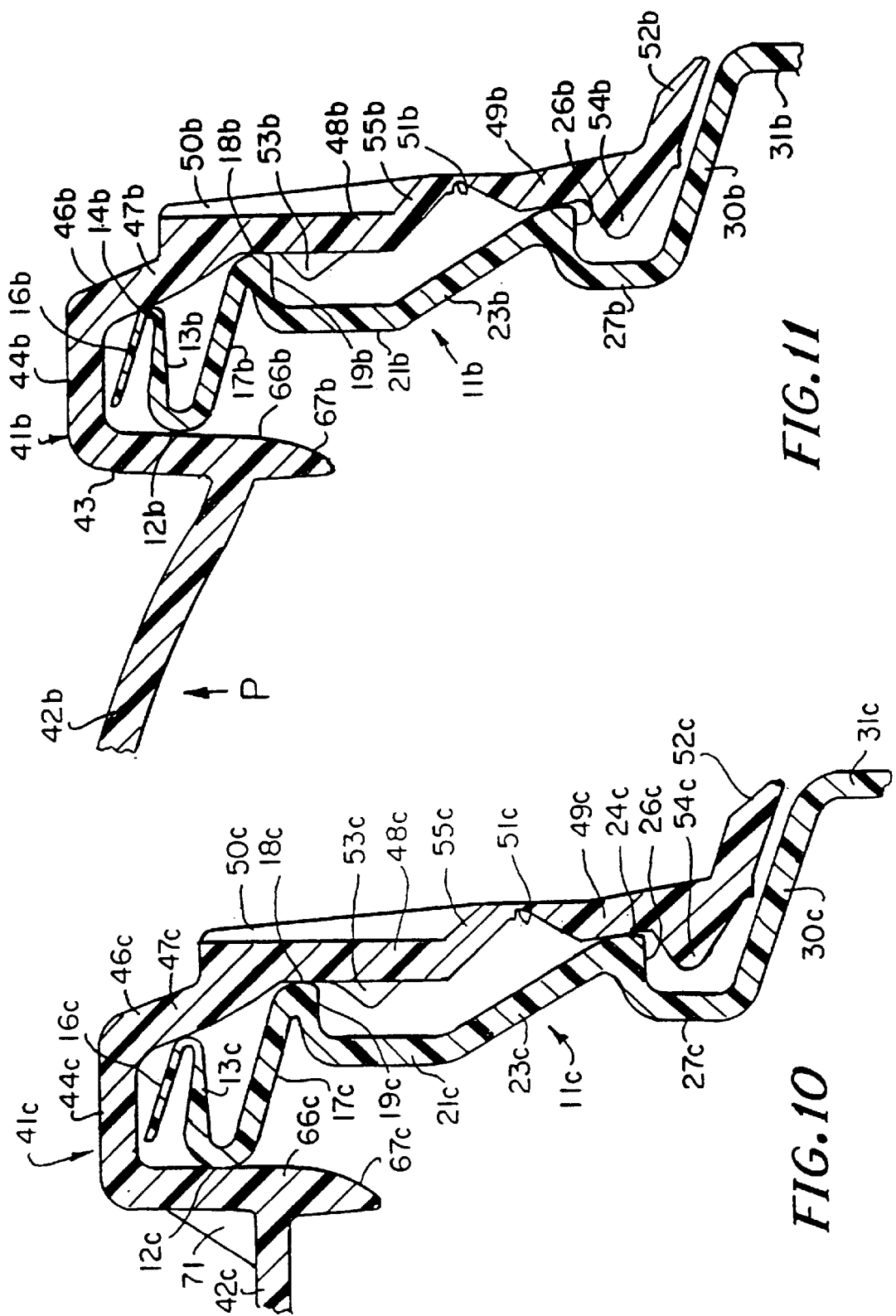

CONTAINER NECK FINISH AND METHOD AND APPARATUS FOR FORMING SAME AND CAP FOR USE THEREON

CROSS REFERENCE TO RELATED APPLICATIONS

This application is a Continuation-in-Part of U.S. patent application Ser. No. 08/385,808 filed Feb. 9, 1995, entitled BLOW MOLDED CONTAINER STRUCTURE, CAP THEREFOR AND METHOD OF FORMING SAID NECK, now abandoned.

BACKGROUND OF THE INVENTION

1. Field of the Invention

This invention relates to a new and improved blow molded neck construction for bottle or other container, a cap therefor, a method of forming said neck and molds for forming said neck. More particularly, it relates to the neck finish for a blow molded plastic bottle characterized by the fact that when used with a cap having a plug (i.e., inner skirt) the surface of the neck against which the plug seals is a seal surface without parting lines and no portion has a diameter less than tat of the seal surface. Hence, the plug seals against a smooth surface and leakage is prevented.

2. Description of Related Art

An exemplar of the prior art is U.S. Pat. No. 4,691,834 which shows an upward inward directed flexible flange sealing against the corner of the intersection of the outer wall of the plug and the underside of the top of the cap. The neck sealing surface is, inherently, somewhat uneven and ragged since the neck is cut or sheared adjacent this sealing surface. In the present invention, however, the neck is trimmed on the edge above the seal surfaces but such edge is not the portion of the neck which seals against the cap plug.

The references cited against said U.S. Pat. No. 4,691,834 are likewise distinguishable.

U.S. Pat. Nos. 4,625,876 and 4,798,301 show curved plug contacting surfaces but these are of substantially the same diameters as the inner edge of the flanges which engage the underside of the top of the cap.

SUMMARY OF THE INVENTION

The bottle of the present invention is blow molded in a split mold by techniques well known in the art. The surfaces of the mold which define the neck structure cause the neck shape hereinafter described. An upper portion of the parison above the neck is trimmed or cut from the neck according to conventional practice (e.g. pull-up trim, spin trim, ram-down, etc.) In one neck structure the circle at which the upper portion of the parison is severed from the neck is the inner edge of an inward upward slanted flange. The other end of the flange merges into a curved surface which extends inward a greater distance than the aforesaid edge to merge with an internal sealing surface of lesser diameter than said edge. The neck structure above the neck sealing surface may have rapidly changing diameters which form a flexible membrane due to parison stretching in the blow molding process. In one form of the invention, below the sealing surface the exterior of the neck structure slants downward outward to a horizontal shoulder and then extends downwardly and then outwardly to a second or lower shoulder. Other cap engaging means may be used.

A cap with which the neck is used has a top having a depending central plug or inner skirt, the outer surface of which seals tightly against the sealing surface of the neck. The cap also has an outer skirt having internal sealing beads which engage the upper and lower shoulders of the neck to hold the cap in place. The lower portion of the outer cap skirt may be removed by the user engaging and pulling a pull tab which causes the lower part of the skirt to disengage at a circumferential score line. Until such lower skirt is removed, the cap and neck are tamper-evident. Other types of neck engaging means may be emphasized.

Several different ways may be employed to form the neck finishes of the present invention in blow molding operations. One such means employs a conventional blow mold wherein a blow dome is formed above the neck finish with several abrupt bends in the parison between the blow dome and the neck sealing surface. The blow dome is trimmed from the neck in a conventional trimming operation.

In another modification of the invention, the shear steel located above the neck finish insert has a projecting extension which is engaged by an outward projection on the blow pin so that when the blow pin is withdrawn, the two extensions shear the parison above the sealing surface of the neck.

In still another form of the invention, the shear steels have inward projections, and the blow pin has an enlarged upper diameter so that as the molds come together the shear steel projection cuts the parison by shearing against the enlargement of the blow pin.

In still another form of the invention, the shear steel is formed with an outward projection and the blow pin is formed with an outward projection below the level of the shear steel. When the blow pin is removed, the two projections shear the excess parison. In this form of the invention the neck finish is approximately vertical above the sealing surface.

The accompanying drawings, which are incorporated in and form a part of this specification, illustrate embodiments of the invention and, together with the description, serve to explain the principles of the invention:

BRIEF DESCRIPTION OF THE DRAWINGS

FIG. 1 is a side elevational view of a neck portion of ajar in accordance with the present invention partially broken away to reveal structure.

FIG. 2 is an enlarged sectional view of the neck structure and a portion of a blow dome superimposed thereabove.

FIG. 3 is a side elevational view of a cap with which the neck is used, the cap being partially broken away in section to reveal internal construction.

FIG. 7 is an enlarged sectional view showing schematically the seating of the cap on the neck.

FIG. 8 is a view similar to FIG. 7 of a prior art device.

FIG. 9 is a view similar to FIG. 7 of a modification.

FIG. 10 is a view similar to FIG. 7 of another modification.

FIG. 11 is a view similar to FIG. 7 showing possible distortion of the cap top if pressure is applied to the container.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 12:
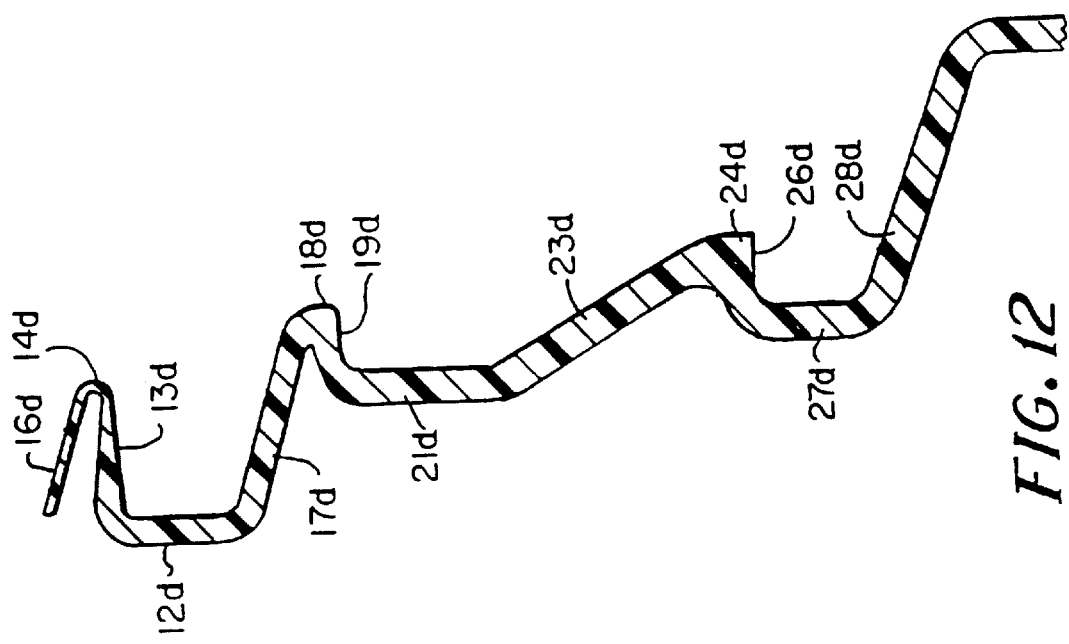
FIG. 12 is an enlarged view of the neck structure showing an alternate seal area.

Neck 11 is formed on a thin-walled jar or other container and has a curved primary seal surface 12 which is very smooth and is distinguished by the absence of parting lines inasmuch as it is formed by air pressure or other mechanical means during the blow molding process and is not formed by the mold halves and thus does not have a mold parting line formed therein. As shown in FIG. 12, seal surface 12 may be vertical or it may be curved, as shown in FIG. 2. Further, the primary sealing surface has minimal ovality, by reason of the way it is formed. Above surface 12 the neck structure extends outwardly in a outward stretch 13 which terminates in an upward bend 14. Above bend 14 is a thin, tapered upward-inward extending flange 16, the inner edge of which is of greater diameter than the diameter of surface 12. Below surface 12 the neck extends downwardly-outwardly in a slanted stretch 17 which terminates in a short vertical stretch 18, there being an inward directed substantially horizontal upper shoulder 19 below surface 18. Vertical stretch 21 extends downwardly from the inner edge of shoulder 19 terminating in an inwardly curved portion 22 which merges with an outward downward stretch 23. An approximately vertical short surface 24 (of greater diameter than surface 18) terminates in a second or lower horizontal inward directed shoulder 26. Vertical stretch 27 depends from the inner edge of shoulder 26, merging with an outward stretch 30 which merges with an outward downward stretch 29. The lower end of stretch 29 merges with an inward downward stretch 31.

In accordance with one form of standard blow molding practice, a parison of the plastic material from which the container is to be formed is deposited in the split mold. Air is blown into the parison to expand it to fill the mold. In this form of the present invention, the mold has an insert which shape the finish of the neck of the container heretofore described and above the neck insert the mold widens out to establish what is known as a blow dome of excess material. The blow dome is severed from the neck finish by well-known means. In accordance with one form of the present invention, as distinguished from prior neck finishes, the blow mold is severed at the inner edge of flange 16, as by trimming. Severing the edge of the neck from the blow dome may cause a rough surface. One of the advantages of the present invention is that the edge at which the blow dome is severed is not the primary sealing surface 12. Thus, directing attention to FIG. 2, blow dome 33 has an outward upward slanted stretch 34 merging into a curved stretch 36 which has an inward slanted stretch 37. The cut line 38 is a circle wherein the stretch 34 is severed from the inner edge of flange 16. By reason of the almost 180° bend 14, and the rapid diameter changes within a relatively short vertical distance flange 16 is thin and flexible.

Figure 14:
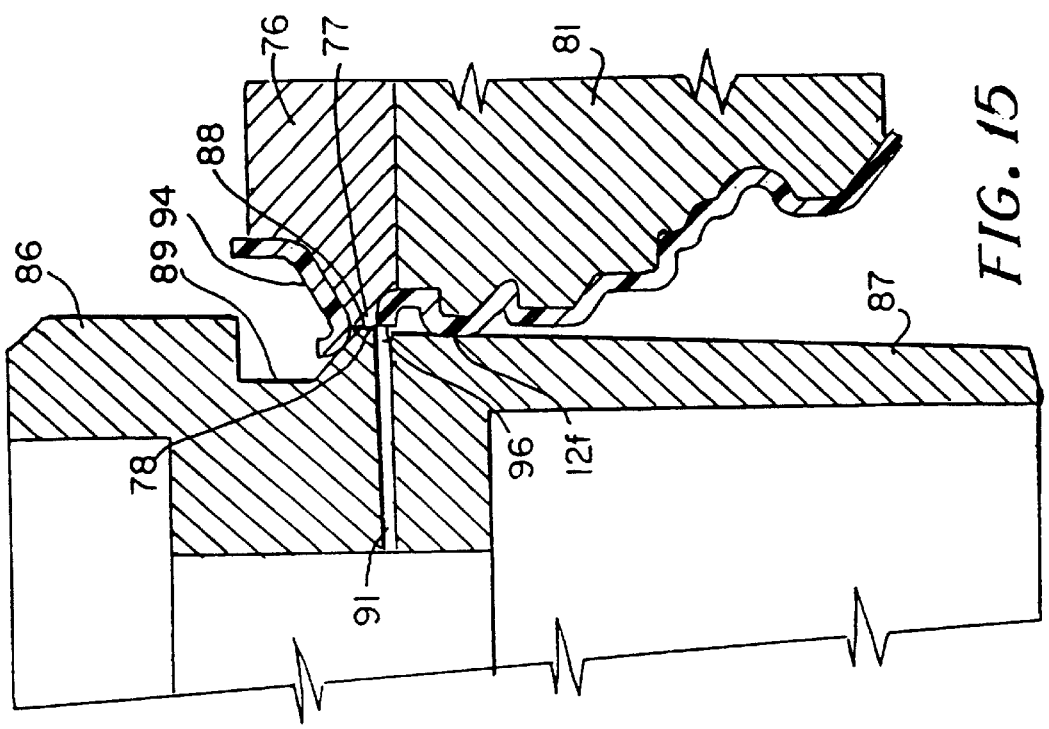
FIG. 14 is a vertical sectional view through a modified container neck and portions of the mold and blow pin forming same.
Figure 15:
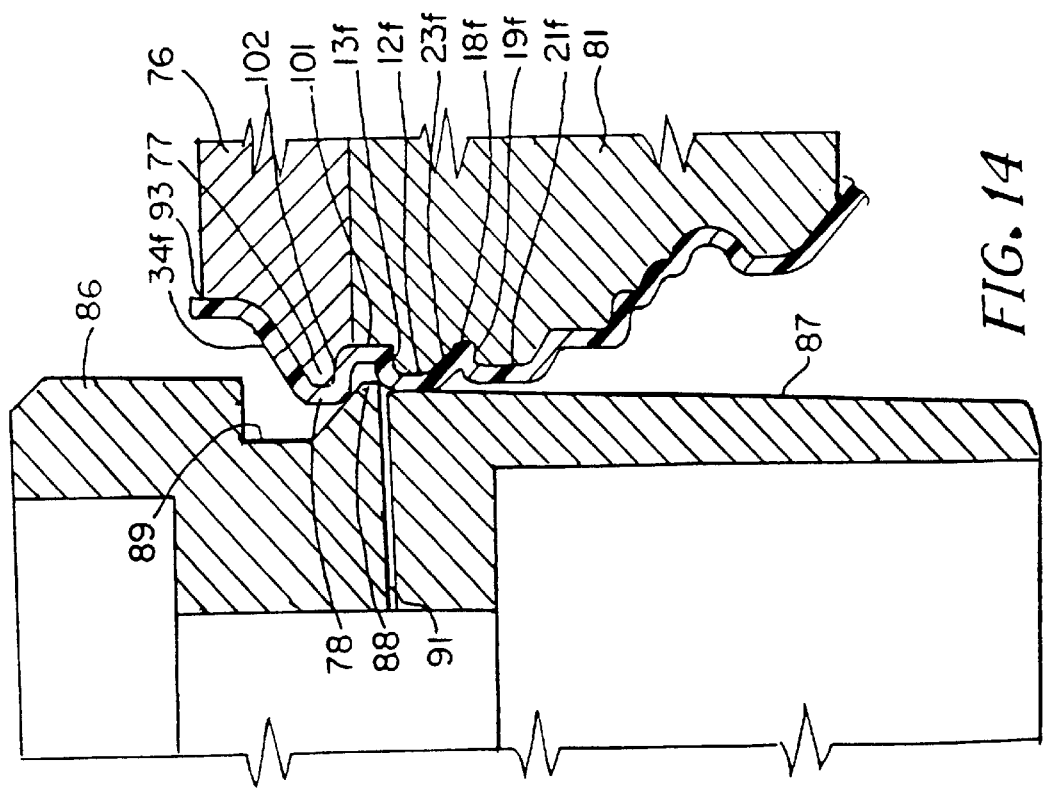
FIG. 15 is a view of similar to FIG. 14, showing the blow pin in raised position.

As shown in FIGS. 14 and 15, another way to achieve the neck structure of the present invention is to employ what is commonly referred to as "pull-up" trim. In this case the cut line 38 is achieved by having a close diametrical fitting of a blow pin positioned internally within the parison and sets of shear steels mounted on the split mold. Diameters of the blow pin are typically 0.001 inch to 0.004 inch smaller than that diameter defined by the shear steels in closed position. After blowing of the neck and container, the portion of the parison above cut line 38 is severed from the neck portion below cut line 38 by upward movement of the blow pin relative to the shear steels.

It will be understood that the type plastic used to mold neck 11 may be any suitable relatively hard plastic such as polyethylene.

One form of closure or cap used with the present invention is shown in FIGS. 3–7. The closure of FIGS. 3–7 comprises an indented circular top 42 having a short peripheral cylindrical upward extending member 43 from which extends outwardly a stack rim 44. The outer edge of rim 44 has a depending downward stretch 46 which merges into vertical, substantially cylindrical upper outer skirt 48. The lower end of skirt 48 merges into an outward downward slanted stretch 55. Below stretch 55 is the lower substantially cylindrical outer skirt 49. An internal scoreline 51 separates stretch 55 from lower skirt 49. Below lower skirt 49 the cap has an outward downward slanted flange 52 which, for practical purposes, rests against the surface 30 of neck 11. Interrupted upper inner bead sections 53 engage under the shoulder 19. Lower inner bead 54 at the lower end of skirt portion 49 engages under the shoulder 26. When the cap is attached, the beads 53 and 54 prevent cap 41 from being removed from neck 11. In order to enable the user to grip cap 41, ribs 50 extend outwardly from member 48 merging with the outer surface of lower skirt portion 49 as best shown in FIG. 7. Ribs 50 also impart columnar strength to the closure to transfer vertical force and prevent closure collapse during axial application of the closure to the finish.

Figure 4:
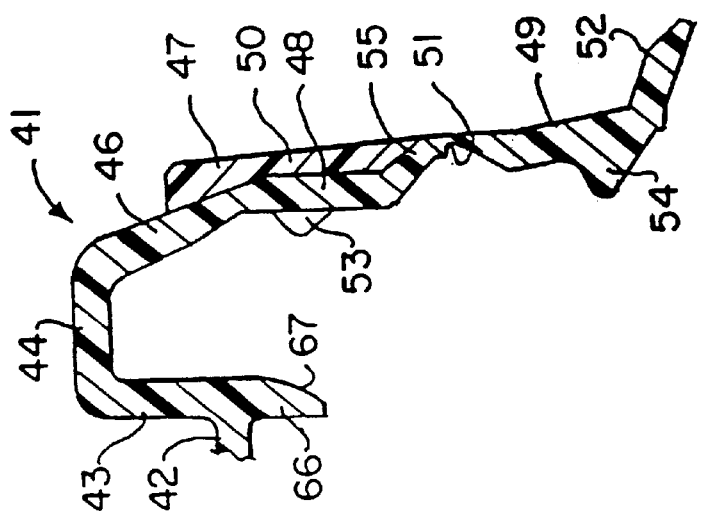
FIG. 4 is an enlarged sectional view of a portion of FIG. 3.
Figure 6:
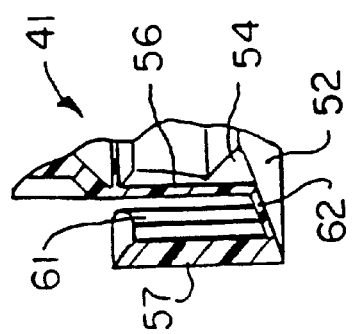
FIG. 6 is a fragmentary sectional view taken substantially along the line 6—6 of FIG. 5.
Figure 5:
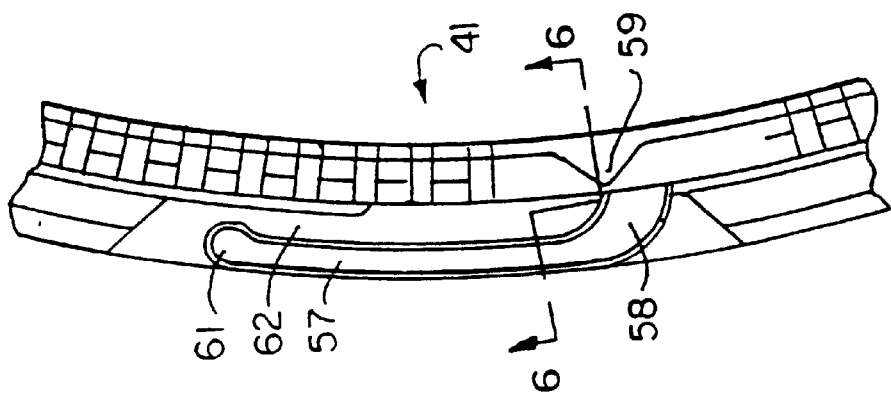
FIG. 5 is a further enlarged fragmentary bottom plan view of a portion of the cap showing a top view of the pull tab.

At one portion of the circumference of lower skirt 49 (as best shown in FIGS. 5 and 6), spaced downwardly therefrom is a horizontal pull tab 57 having a curved connection 58 to skirt 49. The interior of skirt 49 is formed with a notch 59 where tab 57 joins lower skirt 49. Notch 59 forms a vertical line of weakness through skirt 49. Enlargement 61 is formed on the distal edge of pull tab 57. The flange 52 is formed thinner than the rest of flange 52 in the thin area 62 adjacent tab 57.

As a downward extension of cylindrical member 43 the cap 41 is formed with a depending skirt extension 66, the lower inner edge of which is formed with a radius 67. The inner surface of member 43 seals against primary seal surface 12. The vertical position of cap top 42 can be adjusted to provide for compression of surface 12 against the adjacent surface of member 43.

Directing attention to FIG. 7 it will be seen that the surface 12 is the primary sealing surface against the member 43. As has been noted, the surface 12 is very smooth and hence forms a very effective seal against the member 43.

When the cap is applied, the beads 53 and 54 lock under the shoulders 19 and 26 to prevent removal of the cap and hence are tamper evidencing. When the user wishes to open the container, the user grips the enlargement 61 and bends the pull tab 57 outwardly and then pulls circumferentially, tearing the lower skirt 49 from the upper cap portion. The user may then grip under the surface 55 which, as shown in FIG. 7, is spaced from the bottle finish by a considerable gap, and pull upwardly causing the interrupted upper bead segments 53 to disengage from shoulder 19 so that the cap may be removed. The ribs 50 rigidify the upper portion of the cap to allow the forces necessary to push the cap onto the bottle from causing the cap to buckle. The portion of the cap above line 51 constitutes a reclosure cap and may be pressed back on the neck after portions of the contents of the jar are dispensed as frequently as required.

Comparison of FIG. 7 with prior art structure shown in FIG. 8 shows that in the present invention the very smooth surface 12 causes a tight seal against the exterior of member 43 and the flange 16 need not seal at all, whereas in the prior art the cut inner edge of the flange is a primary seal. The primary seal surface 12 has minimum deviation from ovality as compared to FIG. 8 where the primary seal is coincident with a trim surface. Bottles of the type of this invention and the prior art were molded. The ovality of the two types was measured. The unexpected result of these experiments was that the current invention produced a significantly more circular primary seal area. Refer to Table A. for tabulated results. The stretch occurring on both sides of the primary seal 12 is primarily contributing to the superior ovality and differentiate it from prior art.

TABLE A

| STD BOTTLE STYLE | | | | PRESENT INVENTION | | | |
| --- | --- | --- | --- | --- | --- | --- | --- |
| Run A | Run B | Run C | Run D | Run A | Run B | Run C | Run D |
| 0.055 | 0.020 | 0.048 | 0.028 | 0.024 | 0.058 | 0.002 | 0.015 |
| 0.053 | 0.002 | 0.056 | 0.015 | 0.006 | 0.010 | 0.106 | 0.030 |
| 0.062 | 0.000 | 0.044 | 0.010 | 0.017 | 0.002 | 0.013 | 0.010 |
| 0.043 | 0.010 | 0.058 | 0.003 | 0.016 | 0.004 | 0.005 | 0.027 |
| 0.058 | 0.029 | 0.025 | 0.009 | 0.014 | 0.013 | 0.005 | 0.034 |
| 0.064 | 0.016 | 0.055 | 0.003 | 0.011 | 0.060 | 0.017 | 0.017 |
| 0.011 | 0.005 | 0.059 | 0.002 | 0.004 | | 0.003 | 0.017 |
| 0.019 | 0.013 | 0.049 | 0.005 | 0.007 | | | |
| 0.042 | 0.006 | 0.045 | 0.002 | 0.013 | | | |
| Average 0.028 | | | | Average 0.016 | | | |

If the contents of the container are non-viscous (e.g., brine-packed pickles) or if the walls of the container are easily squeezed during transportation or handling, top 42 may be subjected to upward pressure causing it to become "domed" (outwardly convex). Such action may cause the inner skirt member 43 to pivot away from curved primary seal 12, resulting in leakage. This effect is illustrated in FIG. 11.

FIG. 9 shows one remedy for such leakage. Contrasting FIG. 9 with FIG. 7 it will be seen that top 42b is raised relative to stack rim 44b and that the contact of surface 12b with inner skirt member 43b is more closely opposite top 42b. In addition, reducing the vertical spacing between top 42b and stack rim 44b reduces the lever arm and corresponding mechanical advantage of the inward force component generated by internal pressure. Hence doming of top 42b does not result in pivoting of skirt 66b out of sealing contact with surface 12b. FIG. 11 shows how pressure applied to the container (as by squeezing the side wall) may cause top 42b to bow upward, pulling plug 66b away from such surface 12b.

FIG. 10 shows another remedy for leakage due to doming of surface 42c. A plurality of angularly spaced, substantially radially gussets 71 are formed at the intersection of top 42c and cylindrical member 43c. Gussets 71 prevent member 43c from pivoting away from surface 12c. A similar result can be achieved by replacing gussets 7 with a continuous reinforcing bead or shoulder at the intersection of the exterior surfaces of top 42c and member 43c.

FIG. 12 illustrates a shape wherein seal surface 12d is cylindrical rather than curved.

Figure 13:
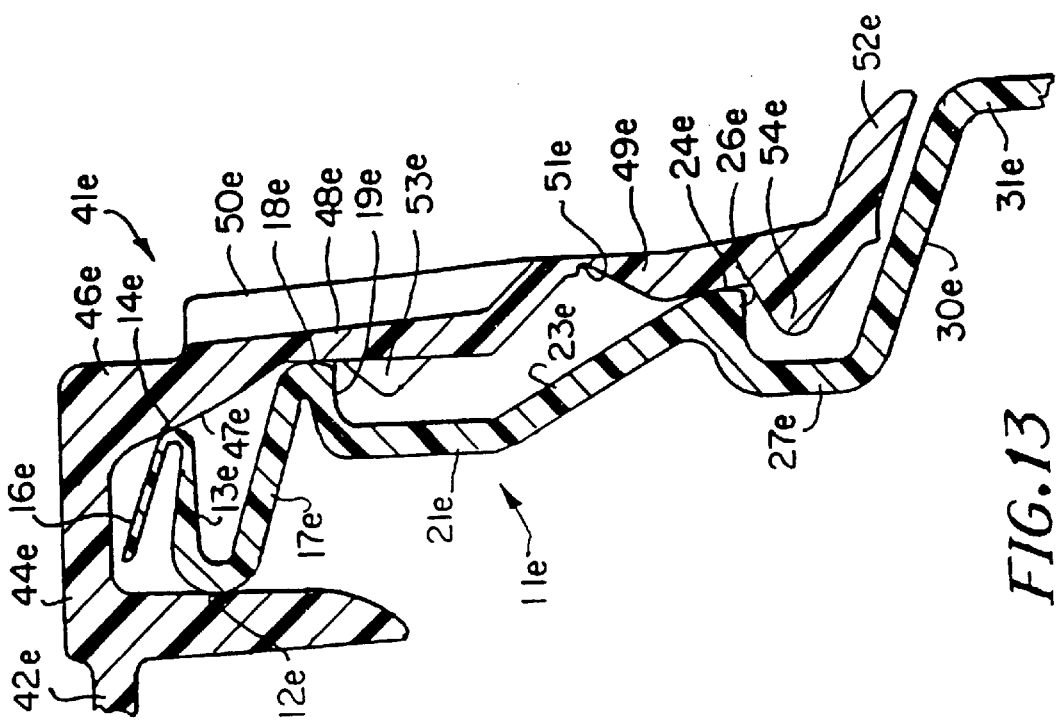
FIG. 13 is a view similar to FIGS. 9 and 10 showing modified sealing surface positions.

FIG. 13 shows a structure in which top 42c is closer to the level of rim 44e. Surface 12e engages the surface of cylinder 43e below the level of top 42e.

Directing attention to the modification shown in FIGS. 14 and 15, formation of a modified container neck is shown. Such a neck may resemble that shown in FIGS. 1 and 2 of U.S. Pat. No. 4,699,287, with an important modification, as hereinafter explained. In FIG. 14 the parison forming the neck is shown between a blow pin 86 and shear steel 76 and neck insert 21 as molding is being completed.

Shear steel 76 has an inward projection 77 terminating in a vertical inward extending shearing edge 78. Blow pin 86 has a lower cylindrical portion 87 having an outward extending shearing edge 88 with a groove 89 thereabove.

As shown in FIG. 14, blow molding of the parison to the shape of shear steel 76 and neck insert 81 has just been completed. The shape of the parison generally resembles the neck shown in said U.S. Pat. No. 4,699,287. Edge 88 is located below edge 78. Air blowing through hole 91 has formed vertical stretch 100 and inward horizontal stretch 102 as well as the portions thereabove. The smooth, vertical, lower cylindrical portion 87 has formed internal primary seal surface 12f.

The blow pin 86 then moves from the position of FIG. 14 to the position of FIG. 15. The neck structure is sheared between edges 78 and 88. Inner flange edge 96 is formed where the edges 78, 88 have sheared the same and the parison sheared-off portion 94 thereabove is discarded.

It is noted that edge 96 is of a larger diameter than primary seal surface 12f. hence the hollow plug or inner skirt such as that shown in U.S. Pat. No. 4,699,287 seated on the container neck seals against surface 12f instead of surface 96. Since blow pin 86 has no parting line surface 12f has no flash. Surface 12f is smooth and its diameter is always the same during repetitive molds and hence makes a superior seal with the cap plug.

Figure 16:
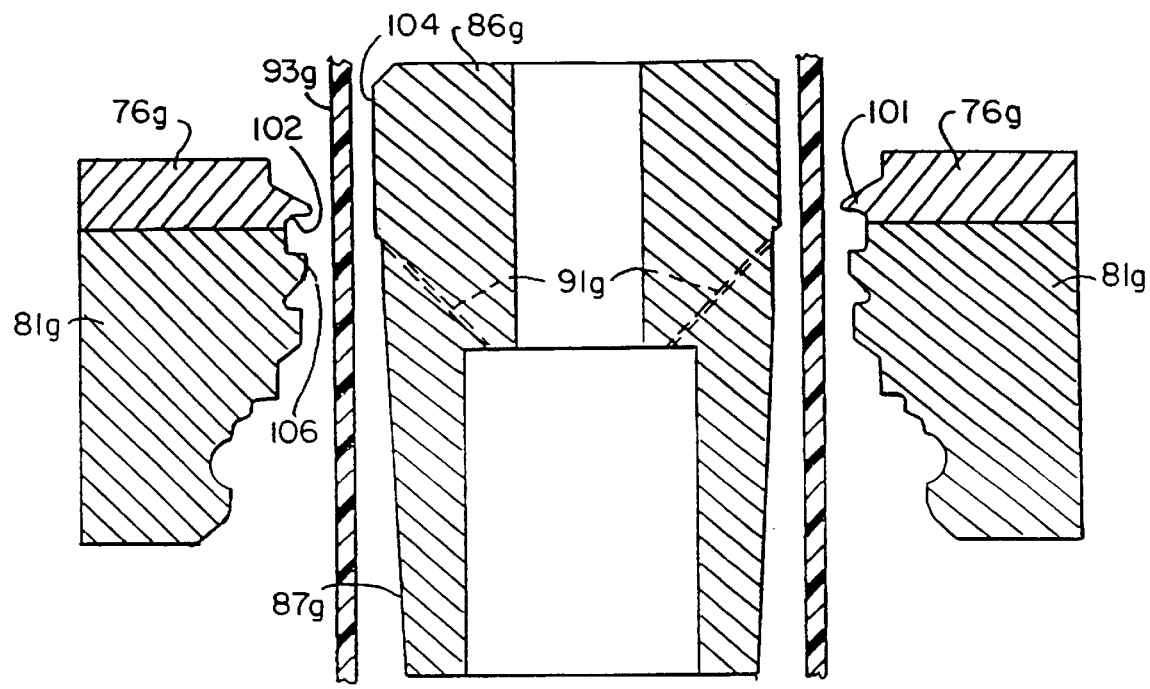
FIG. 16 is a schematic sectional view through a portion of a mold, blow pin and parison, with the mold in open position.
Figure 17:
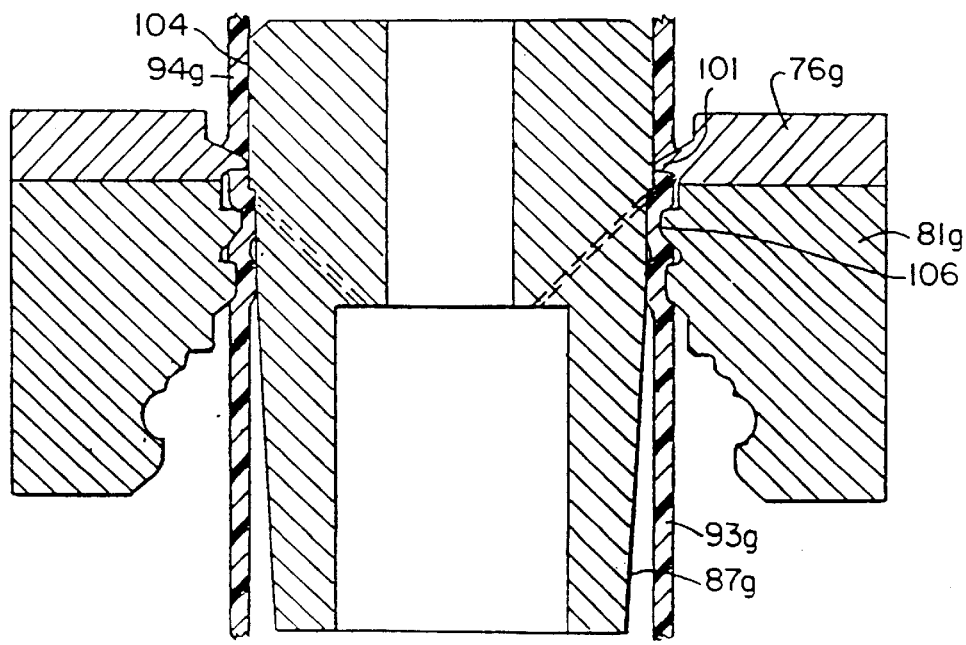
FIG. 17 is a view similar to FIG. 16 with the mold closed.
Figure 18:
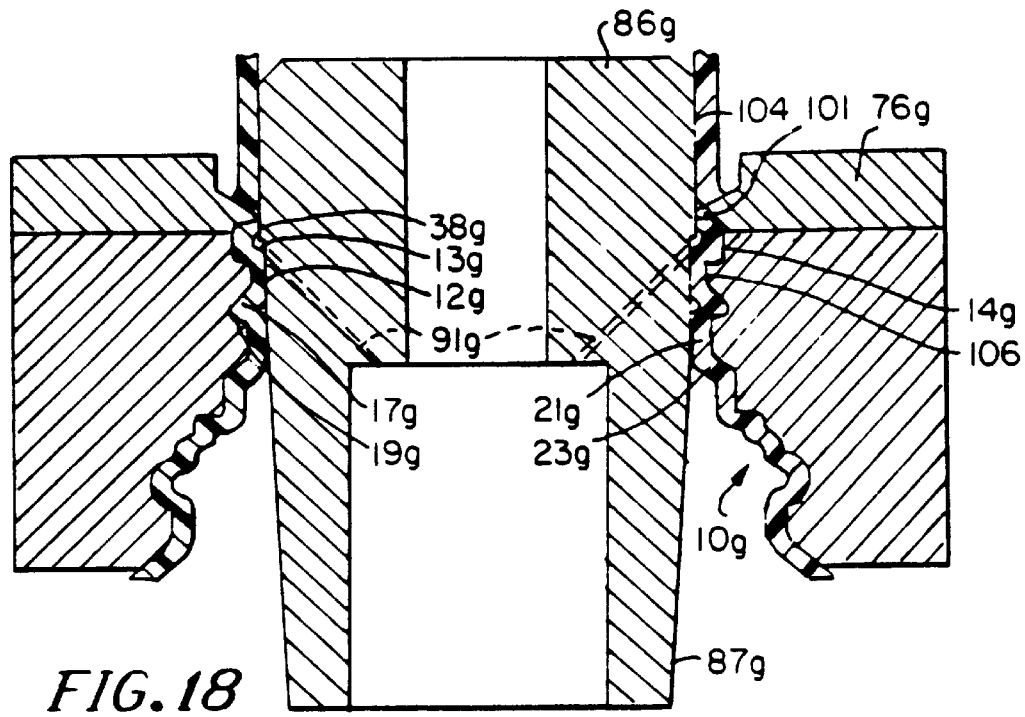
FIG. 18 is a view similar to FIG. 17 after air has been blown into the mold.

Directing attention to FIGS. 16–18, shear steel 76g has an inward directed cutting edge 101, the inside diameter of which is approximately equal to the enlarged diameter of the upper portion 104 of blow pin 86g. Below cutting edge 101 is an undercut 102. Neck insert 81g has a seal forming projection 106 which has an inside diameter which is greater than the outside diameter of the cylindrical portion 87g of blow pin 86g by a distance slightly greater than the thickness of the parison 93g.

When the neck molds are closed, the cutting edge 101 cuts off the upper portion 94g of the parison by reason of edge 101 engaging the enlarged outside diameter portion 104 of the blow pin. The seal forming projection 106 squeezes the parison against the blow pin lower portion 87g to form the smooth, compressed seal surface 12g.

As shown in FIG. 18, when air is blown through the pin 86g, the parison assumes the shape of the neck insert. Thus neck 10g has primary seal surface 12g has an outward stretch 13g, a bend 14g, and a cut line 38g. The inside diameter of the cut line 38g is slightly greater than the primary seal surface 12g. In other respects the shape of the neck 10g resembles that of FIG. 15.

Figure 19:
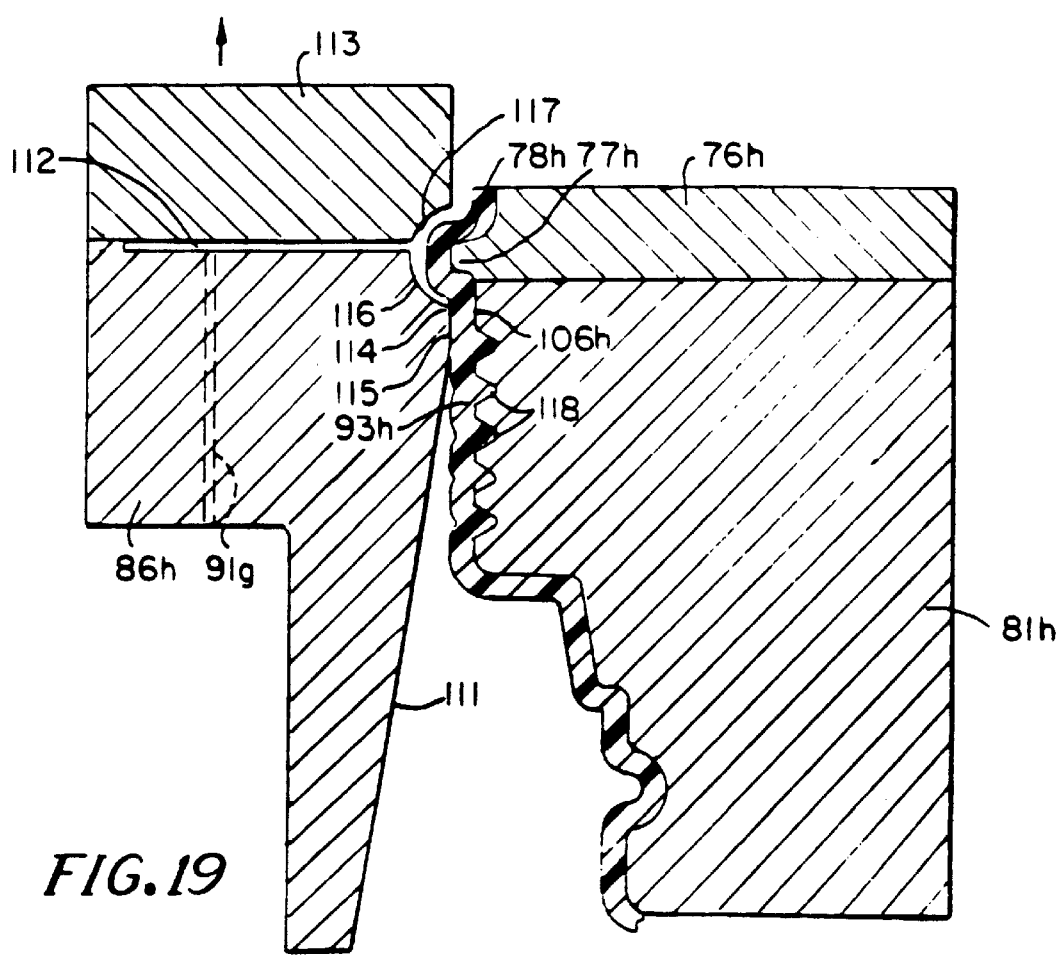
FIG. 19 is a fragmentary sectional view of a further modified mold, blow pin and parison.

Directing attention now to FIG. 19, a different shape neck is produced by the mold parts therein illustrated. Blow pin 86h has a lower tapered portion 111 at the upper end of which is a vertical cylindrical surface 115 which is smooth and terminates at its upper end in a shear corner 114. Above corner 114 is a cut-away 116. Blow pin 86h may be made of two parts in order to facilitate fabrication. As shown in FIG. 19 the lower portion 86h is attached to upper blow pin 116 and radial grooves or channels 112 are cut in the top surface of 86h, being connected to vertical air holes 91h. Thus when air is blown into the blow pin 86h air travels up holes 91g and out channels 112. The lower corner of upper blow pin 113 is formed with a cut-away 117 which merges with cut-away 116 to clear the inward shearing edge 78h of inward extension 77h of shear steel 76h. The upper end of neck insert 81h is formed with seal forming projection 106h which presses the parison against surface 115. The neck formed in neck insert 81h has external threads and hence grooves 118 for such threads are formed therein. Below the threaded portion of the neck, the bottle may assume any desired shape and hence the details of the neck insert 81h which form the same are not specifically set forth.

After the neck has been blown, as shown in FIG. 19, the blow pin 86h is raised and hence the shear corner 114 shears off the parison by shearing action against edge 78h. Thus the neck has a straight upward section 122 which is a smooth sealing surface characterized by the absence of mold parting lines and also characterized by the absence of rough edges.

Figure 20:
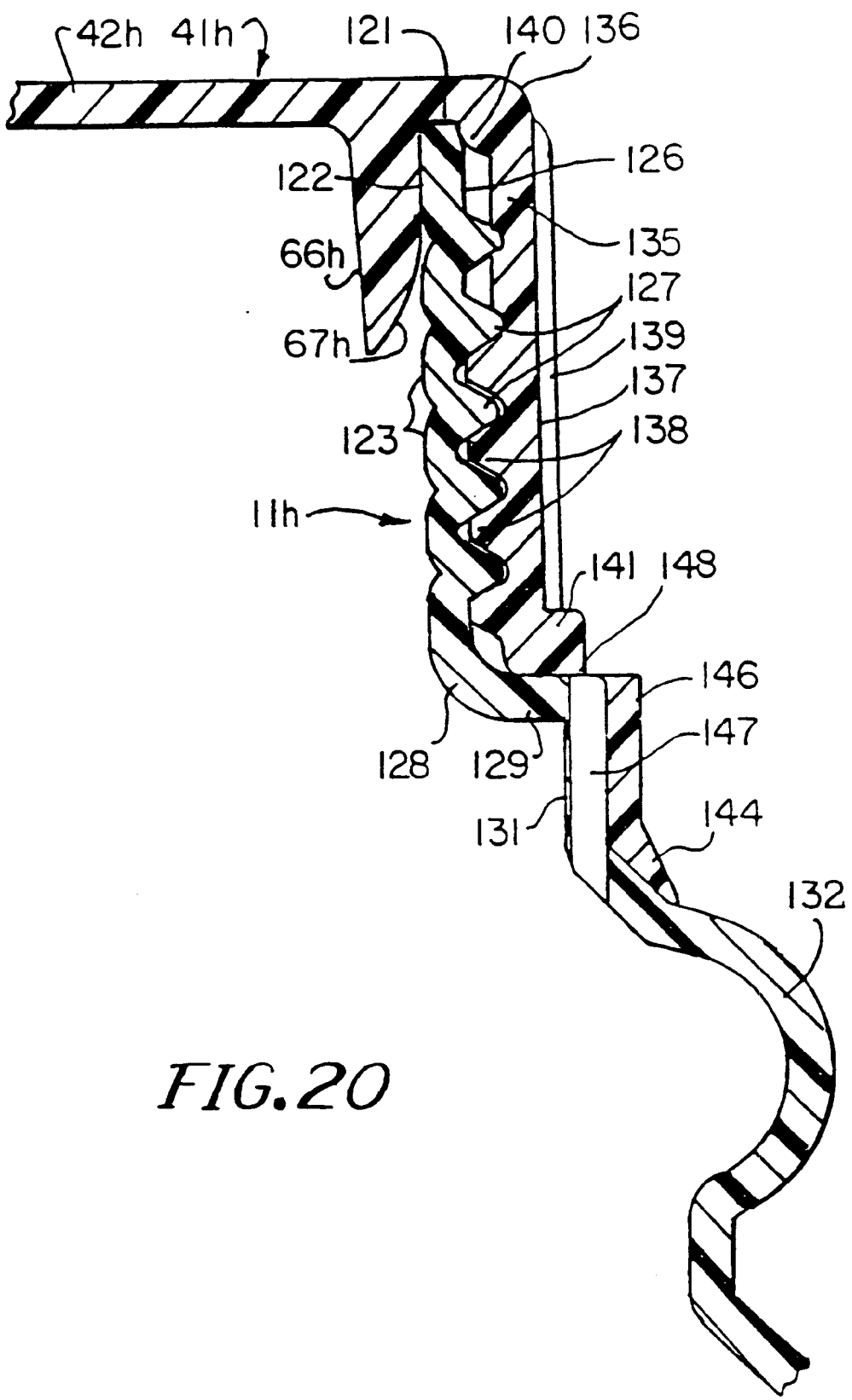
FIG. 20 is a fragmentary sectional view of a neck formed in accordance with FIG. 19 and a cap seated thereon.

Directing attention to FIG. 20, the neck 11h formed in the mold parts shown in FIG. 19 is illustrated with a cap 41h snapped thereon. Thus neck 11h has an upper lip 121 below which is a vertical, smooth, seamless seal surface 122 with an enlarged diameter portion 123 therebelow. On the outside of the neck 11h there is an upper, vertical, straight surface 126 below which are external threads 127. Below the threads is an outward curved portion 128 which merges with an horizontal shoulder 129. Below the shoulder 129 are outward extending vertical ratchet teeth 131, and below the teeth 131 is the remainder of the neck 132.

Cap 41h has a top 42h with a vertical outer skirt 135 depending from the outer edge thereof. Upper skirt 135 is connected to lower skirt 146 as hereinafter appears. The upper edge of skirt 135 is connected to top 42h by corner 136, and below corner 136 is a substantially vertical stretch 137, the inner surface of which is formed with internal threads 138 which mate with the external threads 127 of neck 11h. On the exterior of upper skirt 135 are vertical ribs 139 which assist the user in unscrewing the cap. An inner filet 140 is formed at the juncture of the underside of top 42h and the inside of upper skirt 135. The purpose of filet 141 is to exert pressure against the upper portion of the neck 11h to force seal surface 122 outwardly. The inner surface of lower skirt 146 is formed with ratchet teeth 147 which mate with the teeth 131. The upper inner corners of teeth 147 are joined to shoulder 141 on the lower end of upper skirt 135 at frangible juncture points 148. Below lower skirt 146 is an outward, downward slanted flange 149 which engages the outside of skirt portion 132.

Depending from top 42h is a plug or inner skirt 66h having a radius 67h at its lower, outer corner. When the neck 11h is forced outwardly by filet 140, it tightly engages the outside surface of plug 66h to form a liquid tight seal.

It will be seen that the cap shown in FIG. 20 is tamper-evidencing. When the cap 41h is unscrewed, the junctures 148 fracture, permitting the cap to be unscrewed but so long as the junctures 148 are in tact, evidence that the cap has not been opened appears.

Figure 22:
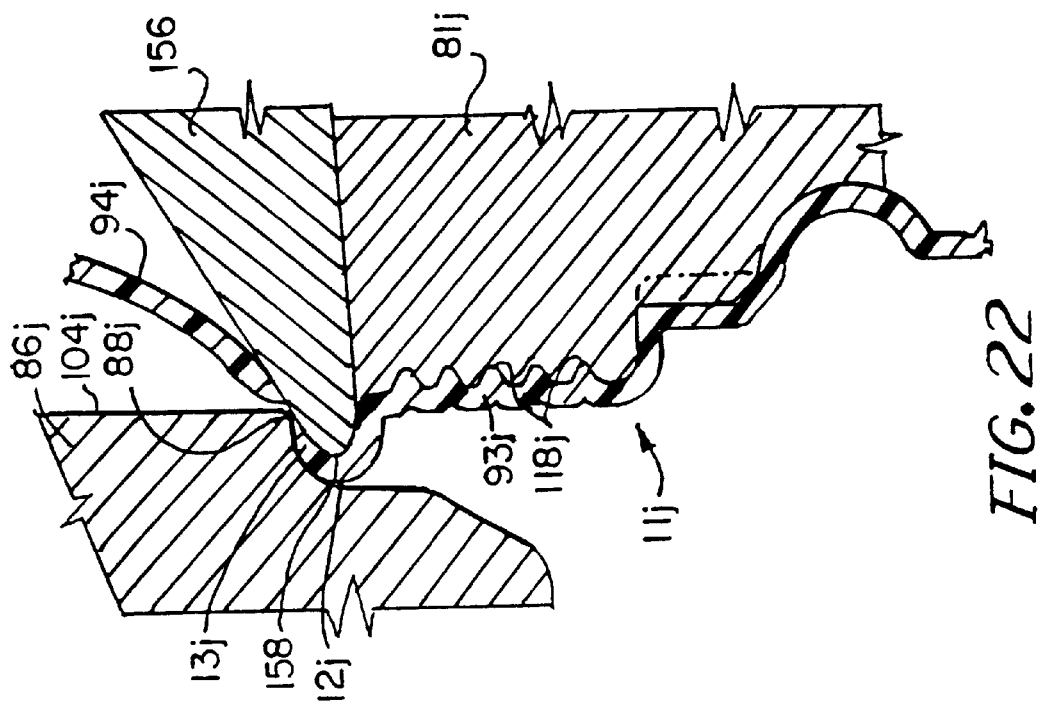
FIG. 22 is a view similar to FIG. 21 showing the blow pin in lowered position.
Figure 21:
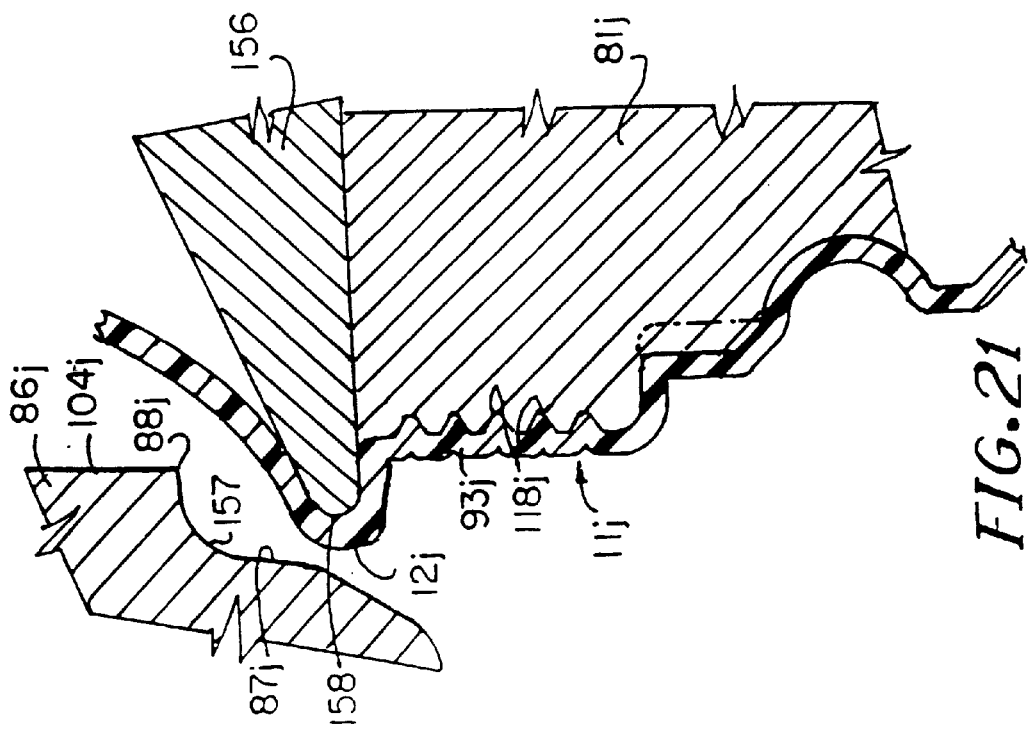
FIG. 21 is a view similar to FIG. 19 of another modified mold, blow pin and parison showing the blow pin in raised position.

Directing attention to FIGS. 21–22 a neck similar to that of FIG. 20 is produced. The molding process used is generally known as "ram down" molding in that the blow pin 86j is forced down on striker plate 156. Blow pin 86j has an upper cylindrical portion 104j, a reduced diameter portion 87j, below portion 104j and a curved portion 157 intermediate portions 87j and 104j. A corner 88j at the juncture of curved portion 157 and upper portion 104j comprises a cutting edge. Neck insert 81j resembles that of FIG. 19. Above neck insert 81j is a striker plate 156 having a rounded point 158 which is opposite curved portion 157 when blow pin 86j is in down position (FIG. 22). The spacing between point 158 and curved portion 157 is slightly less than the thickness of parison 93j. As shown in FIG. 22, when pin 81j is in down position, cutting edge 88j engages striker plate point 158 thereby shearing off parison portion 94j. The parison 93j is squeezed between point 158 and curved portion 175, thereby creating primary seal surface 12j.

It will be understood that different neck shapes are shown formed by the various types of molds and molding methods illustrated in the drawings and described herein. However the neck shapes and molding techniques may be interchangeable, as will occur to one skilled in the art.

In Pigs. 8, 9, 10, 12, 13, 14, 16–18, 19–20, and 21–22 the same reference numerals are used for parts corresponding to those previously mentioned followed by subscripts a, b, c, d, e, f, g, h, and j respectively.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In combination, a neck for a blow molded plastic container and a cap, said cap having a top, an outer skirt depending from said top, a plug substantially vertically depending from said top, said plug being located inward of said outer skirt with an annular gap between said outer skirt and said plug, and neck engaging means on said outer skirt, said neck comprising a sealing portion having a smooth, internal primary seal surface characterized by the absence of mold parting lines sealingly engaging said plug, an outward bend above said sealing portion, an outward extending stretch joined to said outward bend, and upward stretch above said outward extending stretch, an inward bend above said upward stretch, and an inwardly extending flange joined to said inward bend, said flange terminating in a trim line spaced outward of said plug, a second portion below said seal surface, and at least one external cap engaging means on said second portion, said cap engaging means being located entirely below the level of said seal surface.

2. The combination of claim 1 in which said neck engaging means is located entirely below the level of said seal surface.

3. In combination, a neck for a blow molded plastic container and a cap, said cap having a top, an outer skirt depending from said top and a plug substantially vertically depending from said top, said plug being located inward of said outer skirt with an annular gap between said outer skirt and said plug, said neck comprising a first portion having a sealing portion having a smooth, internal primary seal surface characterized by the absence of mold parting lines sealingly engaging said plug, an outward bend above said first portion, a substantially horizontal outward extending stretch joined to said outward bend, an upward bend joined to horizontal outward extending stretch, a substantially vertical upward extending stretch above said upward bend, an inner wall of said upward extending stretch having a greater diameter than said primary seal surface, a trim line at an upper end of said upward extending stretch, said trim line being spaced outward from said plug and not sealing against said plug, and an outward-downward extending second portion below said first portion and at least one external cap engaging means on said second portion, said external cap engaging means being located entirely below said sealing portion.

4. In combination, a neck for a blow molded plastic container and a cap, said cap having a top, an outer skirt depending from said top and a plug substantially vertically depending from said top, said plug being located inward of said outer skirt with an annular gap between said outer skirt and said plug, said neck comprising a first portion having a smooth, internal substantially vertical primary seal surface characterized by the absence of mold parting lines sealingly engaging said plug, an outward bend above said first portion, an outward, substantially horizontal stretch joined to said outward bend, an upward bend at an outer end of said horizontal stretch, an upward, substantially vertical stretch above said upward bend, an upward-inward curved stretch at an upper end of said vertical stretch, a substantially vertical terminus at an inner end of said inward upward-inward curved stretch, said vertical terminus having a greater diameter than said first portion, said terminus being spaced outward from said plug and not sealing against said plug, a second outward-downward extending portion below said seal surface and at least one external cap engaging means on said second portion.

5. In combination, a neck for a blow molded plastic container and a cap, said cap having a top, an outer skirt depending from said top, an inner fillet at the juncture of an underside of said top and an inner surface of said outer skirt, and a plug substantially vertically depending from said top, said plug being located inward of said outer skirt with an annular gap between said outer skirt and said plug, said neck comprising a first portion having a sealing surface having a smooth, internal primary seal surface characterized by the absence of mold parting lines sealingly engaging said plug, said first portion and said seal surface extending substantially vertically upward to a substantially horizontal terminus, said filled biasing said seal surface into tight engagement with said plug, said sealing surface and said first portion having a substantially constant inner diameter, a second portion extending downward below said first portion and at least one external cap engaging means on said second portion, said external cap engaging means being located entirely below said sealing portion.

6. In combination, a neck for a blow molded plastic container and a cap, said cap having a top, an outer skirt depending from said top and a plug substantially vertically depending from said top, said plug being located inward of said outer skirt with an annular gap between said outer skirt and said plug, said neck comprising a first portion comprising a sealing portion having a smooth, internal primary seal surface characterized by the absence of mold parting lines sealingly engaging said plug, said first portion further curving upward-outwardly and tapering distally to a terminus spaced upward and outward of said seal surface, a second portion extending outward-downward below said seal surface and at least one external cap engaging means on said second portion, said external cap engaging means being located entirely below said sealing portion.

7. A method of forming a container neck structure for a thin walled, blow-molded plastic container having a sealing portion having a smooth internal primary seal surface, an upward extending portion above said seal portion, a downward-outward extending lower portion below said seal portion, and at least one external cap engaging means comprising providing a split mold conforming to the exterior of said container, placing a plastic parison within said mold, blowing air into said parison through a blow pin to expand said parison to fill said mold with thin-walled plastic, forming said seal surface smooth and free of parting lines caused by said mold, components, and trimming said upward-extending portion at a circumferential trim line having a circumference no smaller than that of said seal surface, said mold being provided with a blow dome area above said neck and in which said step of blowing air through said blow pin expands a portion of said parison into said blow dome area to form a blow dome and in which said step of trimming comprises cutting said blow dome along a circle of greater diameter than the diameter of said seal surface, said mold being shaped so that said step of blowing air into said parison forms an outward-upward stretch, a bend of approximately 160° and an inward tapered stretch above said bend, said inward tapered stretch being cut off from said blow dome during said trimming step.

8. A method of forming a container neck structure for a thin walled, blow-molded plastic container having a sealing portion having a smooth internal primary seal surface, an upward extending portion above said seal portion, a downward-outward extending lower portion below said seal portion, and at least one external cap engaging means comprising providing a split mold conforming to the exterior of said container, providing a blow pin having a cylindrical portion opposite said primary seal surface and having an external shearing surface larger than said cylindrical portion and a shear steel in said mold above said primary seal surface having an internal shearing surface, placing a plastic parison within said mold, blowing air into said parison through said blow pin to expand said parison to fill said mold with thin-walled plastic, forming said seal surface smooth and free of parting lines caused by said mold, components, and trimming said upward-extending portion at a circumferential trim line having a circumference no smaller than that of said seal surface, said step of trimming comprising moving said blow pin upward relative to said shear steel, said external and internal shearing surfaces cooperating to shear said parison above said primary seal surface, said mold being shaped to form in said parison above said primary seal surface a substantially horizontal extending outward stretch, a substantially vertical stretch above said outward stretch and an inward flange above said vertical stretch, said step of moving said blow pin shearing said inward flange.

9. A method according to claim 8 in which the inner diameter of said inward flange is greater than the inner diameter of said primary seal surface.

10. A method of forming a container neck structure for a thin walled, blow-molded plastic container having a sealing portion having a smooth internal primary seal surface, an upward extending portion above said seal portion, a downward-outward extending lower portion below said seal portion, and at least one external cap engaging means comprising providing a split mold conforming to the exterior of said container, said mold being formed with a rounded pointed striker plate, a blow pin having a first diameter portion, a second diameter portion larger than and above said first diameter portion and a curved intermediate portion between said first and second portions, the juncture of said intermediate portion and said second diameter portion comprising a cutting edge, placing a plastic parison within said mold, blowing air into said parison through said blow pin to expand said parison to fill said mold with thin-walled plastic, forming said seal surface smooth and free of parting lines caused by said mold, components, and trimming said upward-extending portion at a circumferential trim line having a circumference no smaller than that of said seal surface, said step of trimming comprising ramming said pin downward whereby said cutting edge shears said parison against said striker plate.

11. A container neck mold apparatus for use with a parison of pre-determined thickness comprising a blow pin comprising a first seal forming stretch, means for reciprocating said blow pin between a retracted and a projected position, and a split mold, means for moving said mold between an open and a closed position, said mold comprising a second seal forming stretch, the distance between said first seal forming stretch when said pin is in projected position and said second seal forming stretch when said mold is closed being slightly less than said parison thickness whereby a neck molded by said apparatus comprises a smooth internal primary seal surface characterized by absence of parting lines, said mold further comprising an outward directed third stretch above said second stretch, an outward directed fourth stretch above said third stretch, a fifth stretch shaped to form an inward directed-flange above said fourth stretch, and a first shearing edge at an inner edge of said fifth stretch, said pin further comprising a second shearing edge larger than and above said first stretch cooperable with said first shearing edge to shear said flange as said pin moves between projected and retracted positions.

12. A container neck mold apparatus for use with a parison of pre-determined thickness comprising a blow pin comprising a first seal forming stretch, means for reciprocating a said blow pin between a retracted and a projected position, and a split mold, means for moving said mold between an open and a closed position, said mold comprising a second seal forming stretch, the distance between said first seal forming stretch when said pin is in projected position and said second seal forming stretch when said mold is closed being slightly less than said parison thickness whereby a neck molded by said apparatus comprises a smooth internal primary seal surface characterized by absence-of parting lines, and first and second cooperating shearing means on said pin and said mold, respectively, for shearing said parison above said seal surface.

13. Apparatus according to claim 12 in which said first shearing means comprises an enlarged portion above said first stretch and said second shearing means comprises a cutting edge above said second stretch, said cutting edge being substantially equal in diameter to said enlarged portion, whereby said cutting edge and said enlarged portions cut off said parison as said mold moves between open and closed positions.

14. Apparatus according to claim 12 in which said first shearing means is larger than and above said first stretch and said second shearing means is larger than and above said second stretch, said first and second shearing means being substantially equal, whereby when said pin moves between projected and retracted positions said first and second sharing means cooperate to trim said parison.

15. Apparatus according to claim 14 wherein said first shearing means comprises a comer at an upper edge of said first stretch and said second shearing means comprises an inward extension above said second stretch, said pin being formed with a cut away above said corner, whereby when said pin is moved from projected to retracted portions said inward extension cooperates with said corner to shear said parison.

16. Apparatus according to claim 15 which further comprises blowing fluid into said cutaway against said parison to force said parison against said inward extension before movement of said pin from projected to retracted positions.

17. A container neck mold apparatus for use with a parison of pre-determined thickness comprising a blow pin comprising a first seal forming stretch, means for reciprocating said blow pin between a retracted and a projected position, and a split mold, means for moving said mold between an open and a closed position, said mold comprising a second seal forming stretch, the distance between said first seal forming stretch when said pin is in projected position and said second seal forming stretch when said mold is closed being slightly less than said parison thickness whereby a neck molded by said apparatus comprises a smooth internal primary seal surface characterized by absence of parting lines, which blow pin further comprising a cutting edge larger than and above said seal forming stretch and in which said mold further comprises a striker plate having a rounded point comprising said second seal forming stretch and having a lesser diameter than said cutting edge whereby when said blow pin is rammed down against said strike plate said parison is sheared above said seal surface by said cutting edge shearing said parison against said striker plate.

* * * * *

UNITED STATES PATENT AND TRADEMARK OFFICE
CERTIFICATE OF CORRECTION

PATENT NO. : 6,003,699
DATED : December 21, 1999
INVENTOR(S) : Laszlo G. Sandor, *et al.*

It is certified that error appears in the above-identified patent and that said Letters Patent is hereby corrected as shown below:

Column 1 of the title page, second line, replace "Laszlo et al." with
--Sandor et al.--

Column 1 of the title page, at [75], replace "Sandor G. Laszlo" with
--Laszlo G. Sandor--.

Signed and Sealed this

Twenty-fourth Day of April, 2001

*Attest:*

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO. : 6,003,699
DATED : December 21, 1999
INVENTOR(S) : Sandor G. Laszlo et al.

Page 1 of 1

It is certified that error appears in the above-identified patent and that said Letters Patent is hereby corrected as shown below:

Column 7,
Line 1, change "greater" to -- less --.

Signed and Sealed this

First Day of January, 2002

Attest:

Attesting Officer

JAMES E. ROGAN
*Director of the United States Patent and Trademark Office*